(12) United States Patent
Lee et al.

(10) Patent No.: US 11,842,096 B2
(45) Date of Patent: Dec. 12, 2023

(54) PRINT CONTROL BASED ON THE DIFFERENCE IN THE RESIDUAL QUANTITY RATIO OF TONERS

(71) Applicant: HEWLETT-PACKARD DEVELOPMENT COMPANY, L.P., Spring, TX (US)

(72) Inventors: Seung Youl Lee, Seongnam-si (KR); Hae Kee Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/908,287

(22) PCT Filed: Sep. 24, 2020

(86) PCT No.: PCT/US2020/052402
§ 371 (c)(1),
(2) Date: Aug. 31, 2022

(87) PCT Pub. No.: WO2021/236142
PCT Pub. Date: Nov. 25, 2021

(65) Prior Publication Data
US 2023/0059777 A1    Feb. 23, 2023

(30) Foreign Application Priority Data
May 20, 2020  (KR) .......... 10-2020-0060184

(51) Int. Cl.
*H04L 9/40* (2022.01)
*G06F 3/12* (2006.01)
*H04N 1/52* (2006.01)
*H04N 1/60* (2006.01)

(52) U.S. Cl.
CPC .......... *G06F 3/1219* (2013.01); *G06F 3/1204* (2013.01); *G06F 3/1257* (2013.01); *H04N 1/52* (2013.01); *H04N 1/6072* (2013.01)

(58) Field of Classification Search
None
See application file for complete search history.

(56) References Cited

U.S. PATENT DOCUMENTS

| | | | |
|---|---|---|---|
| 7,697,853 | B2 | 4/2010 | Ahn |
| 7,769,308 | B2 | 8/2010 | Kong et al. |
| 7,907,294 | B2 | 3/2011 | Lee et al. |
| 2006/0210295 | A1 | 9/2006 | Nakaya et al. |
| 2008/0298860 | A1 | 12/2008 | Omata |
| 2011/0292421 | A1* | 12/2011 | Murakoshi ......... G03G 15/5091 358/1.9 |

(Continued)

FOREIGN PATENT DOCUMENTS

JP    08-118735 A    5/1996

*Primary Examiner* — Frantz Bataille
(74) *Attorney, Agent, or Firm* — Brooks, Cameron & Huebsch, PLLC (57) ABSTRACT

An example image forming apparatus includes a print engine to form an image by using toners of different colors, a memory to store toner quantity information of the different colors of toners, and a processor to perform a print job by reducing a use of a toner with a small toner residual quantity ratio when a difference in a residual quantity ratio of the toner for each color is greater than or equal to a determined value on the basis of the stored toner quantity information.

15 Claims, 10 Drawing Sheets

(56) References Cited

U.S. PATENT DOCUMENTS

2013/0135422 A1* 5/2013 Kobayashi ............ G03G 13/04
  347/224
2018/0267428 A1 9/2018 Kawajiri

* cited by examiner

FIG. 4 fox

RESIDUAL QUANTITIES OF ALL C, M,
Y, K TONERS ARE VERY LOW.
EXCHANGE ALL C, M, Y, K TONER
CARTRIDGES.

PRINT CONTROL BASED ON THE DIFFERENCE IN THE RESIDUAL QUANTITY RATIO OF TONERS

BACKGROUND

An image forming apparatus may refer to an apparatus which prints print data generated from a terminal apparatus such as a computer on a printing medium such as paper. Examples of the image forming apparatuses include a copier, a printer, a scanner, a facsimile, or a multi-function peripheral (MFP) which implements a combination of the functions of the copier, the printer, the scanner, and the facsimile through an apparatus.

DETAILED DESCRIPTION

Various examples will be described below with reference to the accompanying drawings. The examples described herein may be modified and implemented to various different forms.

When a certain configuration is indicated as being "connected" to another configuration, the configuration may not only include a case of being 'directly connected,' but also a case of being 'connected through another configuration therebetween.' In addition, when a certain configuration is indicated as "including," or "comprising" another configuration, this means another configuration may be additionally included rather than precluding other configurations, unless otherwise specified.

In the disclosure, an "image forming job" may refer to any of various jobs (e.g., print, copy, scan, fax, etc.) related to an image such as generating an image or generating/storing/transmitting an image file, and a "job" may not only refer to an image forming job, but may also include all series of processes necessary for the performance of the image forming job.

In addition, an "image forming apparatus" may refer to an apparatus which performs an image forming job such as printing print data generated in a terminal apparatus such as a computer on a recording medium such as paper. Examples of the image forming apparatus may include a copier, a printer, a scanner, a facsimile, a multi-function printer (MFP) which implements in combination the functions of the copier, the printer, the scanner, and the facsimile through an apparatus, or the like.

An image forming apparatus capable of color printing may perform color printing by using a plurality of toner cartridges, each having a different color. In that case, replacement time points of the respective toner cartridges for each color may vary due to the color consumption for each print job being different. Accordingly, a user may have to purchase and replace a toner cartridge corresponding to each color at different times depending on when a toner of the specific color was depleted.

When purchasing a toner cartridge of a specific color for replacement, there may be the inconvenience of having to make a purchase each time a toner cartridge needs replacement. On the other hand, when purchasing toner cartridges of various colors at the same time when one toner cartridge which is depleted in toner is replaced, there may be the inconvenience of having to store the remaining cartridges which were not replaced.

An example provides an image forming apparatus which controls toner consumption for each color so that the replacement time points of various toner cartridges are close to or the same as each other.

Figure 1:
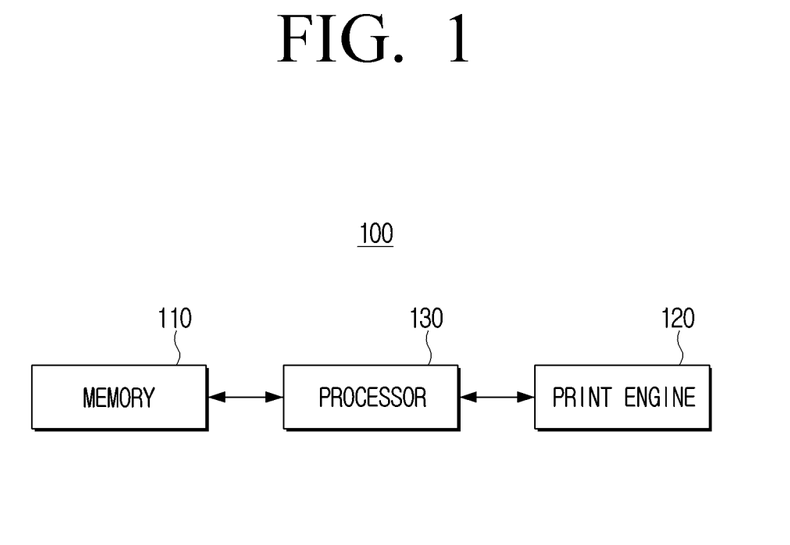
FIG. 1 is a block diagram illustrating an image forming apparatus according to an example.

FIG. 1 is a block diagram illustrating an image forming apparatus according to an example.

Referring to FIG. 1, the image forming apparatus 100 may include a memory 110, a print engine 120, and a processor 130.

The memory 110 may store an instruction for the image forming apparatus 100. For example, the memory 110 may store various programs (or software) for the image forming apparatus 100 to operate according to the various examples.

The memory 110 may store print data. Further, the memory 110 may store bitmap data, binary data, and the like generated during an image forming job with respect to the print data.

The memory 110 may store toner quantity information of different colors of toner cartridges. For example, the image forming apparatus may include toner cartridges (i.e., a cyan toner cartridge, a magenta toner cartridge, a yellow toner cartridge, a black toner cartridge, etc.) corresponding to a cyan, a magenta, a yellow, and a black color, respectively, and the memory 110 may store the toner quantity information of each toner cartridge.

The toner quantity information may include ratio information on a current toner quantity relative to an initial toner quantity such as, for example, 100%, 90%, and the like. The toner quantity information may be represented by volume, weight, and the like. The toner quantity information as described above may be updated for each print job.

The memory 110 may be implemented as a storage medium in the image forming apparatus 100 or an external storage medium such as, for example, a removable disk including a universal serial bus (USB) memory, a web server via a network, and the like.

The memory 110 may be comprised of a plurality of memory devices. For example, the memory 110 may be comprised of a first memory, which stores data necessary in performing an operation of the image forming apparatus, and a plurality of second memories, which are respectively mounted to each of the plurality of toner cartridges to store information on the corresponding toner cartridges. The second memory may be a non-volatile memory such as an electrically erasable programmable read-only memory (EEPROM).

The print engine 120 may form an image by using toners of different colors. For example, the print engine 120 may include a plurality of exposure apparatuses (e.g., a plurality of laser scanning units (LSUs)), a plurality of photoconductive drums, a plurality of developing apparatuses, a plurality of transfer apparatuses, an intermediate transfer belt, etc. Further, the print engine 120 may form an electrostatic latent image on a photosensitive drum per color, develop the toner on the formed electrostatic latent image, transfer the developed toner to an intermediate transfer belt, and transfer the image formed on the intermediate transfer belt to a printing medium to performing a print job.

The exposure apparatus may perform an exposure operation by using a pulse width modulation (PWM) table with a plurality of halftone bit values and an LSU power value for each of the plurality of halftone bit values. An example exposure operation using the PWM table will be described below with reference to FIG. 3.

The processor 130 may control an operation of the image forming apparatus 100. For example, the processor 130 may control an operation of the image forming apparatus 100 by executing an instruction stored in the memory 110. The processor 130 may be configured as a single apparatus such as a central processing unit (CPU), and may be configured as a plurality of apparatuses such as a clock generating circuit, a CPU, a graphics processing unit (GPU), and the like.

In addition, the processor 130 may determine whether a toner saving operation is necessary for a color. For example, the processor 130 may determine that a toner saving operation is necessary for a color if the toner ratio difference per toner cartridge is greater than or equal to a determined value (e.g., 3-5%).

In an example, the processor 130 may determine that one color requires toner saving or may determine that a plurality of colors require toner saving. For example, if the toner quantity of C, M, Y, K is 83%, 83%, 85%, and 90% respectively, the processor 130 may determine to save C toner and M toner.

The processor 130 may not determine whether toner saving is necessary (i.e., not perform the toner saving operation) if the difference in ratio per toner is greater than or equal to a determined value (e.g., 10%) upon implementation. For example, because the difference in toner ratio is generated by a determined value or more when the user changes some of the toner cartridges, the toner saving operation may not be performed in this case.

The processor 130 may, if a toner saving operation is not necessary for a color, control the print engine 120 to perform a print job on print data without a separate toner saving process. For example, the processor 130 may perform rendering on print data to a bitmap image, and performing halftoning on the bitmap image to generate binary data.

The processor 130 may, when the print job is completed, update toner information by determining the toner quantity used at the time of the print job, and subtracting the determined toner quantity.

If a toner saving operation is necessary, the processor 130 may perform the print job by performing a toner saving process on the toner with a small toner quantity. For example, the processor 130 may perform the print job by adjusting an output concentration of a color corresponding to an object that is printed using a toner with a small residual toner quantity ratio. Examples of toner saving methods will be described below with reference to FIG. 3 or FIG. 4.

In the above, a simple configuration of the image forming apparatus 100 has been illustrated and described. However, various components, devices, etc. may be additionally included at the time of implementation. Examples of such additions will be described below with reference to FIG. 2.

Figure 2:
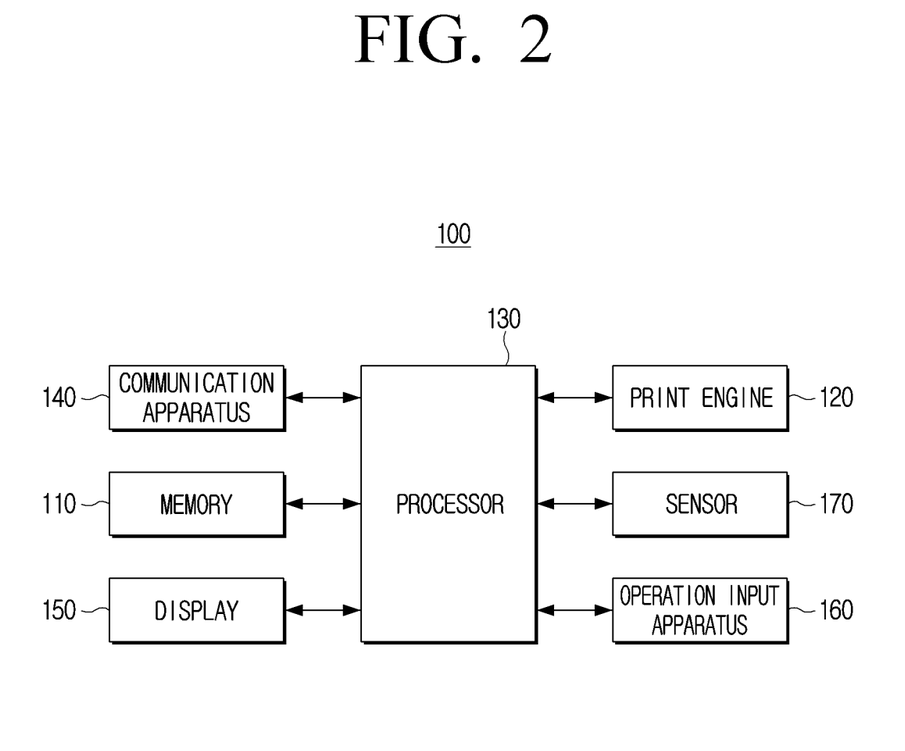
FIG. 2 is a more detailed block diagram illustrating an image forming apparatus according to an example.

FIG. 2 is a more detailed block diagram illustrating an image forming apparatus according to an example.

Referring to FIG. 2, the image forming apparatus 100 may include the memory 110, the print engine 120, the processor 130, a communication apparatus 140, a display 150, an operation input apparatus 160, and a sensor 170.

Since the memory 110 and the print engine 120 have been described with reference to FIG. 1, overlapping descriptions thereof will be omitted. Further, with respect to the processor 130, the descriptions described above will not be repetitively described, and descriptions related to additional configurations in FIG. 2 will be described below.

The communication apparatus 140 may be connected to a print control terminal apparatus (not shown), and may receive print data from the print control terminal apparatus. For example, the communication apparatus 140 may connect the image forming apparatus 100 with an external apparatus, and may be capable of connecting to the external apparatus through a local area network (LAN), an internet network, a USB port, a wireless communication (e.g., Wi-Fi 802.11a/b/g/n, NFC, Bluetooth, etc.) port, and the like. The communication apparatus 140 may also be referred to as a transceiver.

The communication apparatus 140 may, when it is determined that replacement of a toner cartridge is necessary as a toner quantity of the toner cartridge falls below a determined quantity, notify a management server (not shown), an administrator (e.g., the terminal apparatus of an administrator), and the like.

The display 150 may display various information provided from the image forming apparatus 100. For example, the display 150 may display a user interface window for the various functions provided by the image forming apparatus 100 to be selected. The display 150 may be a monitor such as a liquid crystal display (LCD), a cathode ray tube (CRT), a light emitting diode (LED), an organic LED (OLED), and the like. The display 150 may also be implemented as a touch screen capable of concurrently performing a function of the operation input apparatus 160.

The display 150 may display that toner saving may be performed. For example, if an operation of toner saving with respect to a toner may be performed based on a difference of the residual quantity ratio of toners for each color being greater than or equal to a determined value, the display 150 may display information that toner saving for a color may be performed on the user interface window. The display 150 may receive confirmation on whether to apply toner saving through the corresponding user interface window.

The display 150 may display information on toner quantity. For example, the display 150 may, if a residual quantity ratio of a toner color is less than or equal to a determined minimum ratio, display an instruction to replace a toner cartridge corresponding to the toner color.

According to an example, the plurality of toner cartridges may be managed to maintain a similar quantity of residual toner and thus, the display 150 may display that replacement of the plurality of toner cartridges is necessary if the toner quantity of the plurality of toner cartridges is less than or equal to the determined minimum ratio (e.g., 3%).

The operation input apparatus 160 may receive an input of a function selection from the user and a control instruction on the corresponding function. The function herein may include a print function, a copy function, a scan function, a fax transmission function, and the like. The function control instruction may be input through a control menu displayed on the display 150.

The operation input apparatus 160 may receive an authorization instruction on the toner saving operation with respect to a color.

The sensor 170 may detect a toner quantity within a toner cartridge. For example, the sensor 170 may be comprised of a light-emitting element and a light receiving element, and may irradiate light to a light window of a toner cartridge and receive a reflected light quantity. The value or amount of light received may correspond to the residual quantity of toner (or toner ratio). In the illustrated example, the sensor 170 has been illustrated as separate from the print engine 120, but the sensor 170 may also be within the print engine 120 at the time of implementation.

The processor 130 may store the toner quantity received from the sensor 170 in the memory 110. A determination of the toner quantity information may be periodically performed, performed each time a print job is completed, and the like.

The processor 130 may, if it is determined that toner saving on a color may be performed, display information to receive confirmation from the user on the display 150.

Based on receiving confirmation on toner saving on a color through the operation input apparatus 160, the processor 130 may perform a print job by reducing the use of the toner with respect to the color.

As described above, the image forming apparatus 100 may maintain the toner consumption for each color as uniformly as possible so that the replacement time points of various toner cartridges may be close to each other or the same as each other. Accordingly, the user may conveniently manage the plurality of toner cartridges.

In illustrating and describing FIGS. 1 and 2, an example of performing a print job using toner has been illustrated and described. However, the example may also be applied to an image forming apparatus of an inkjet type performing a print job by using ink.

FIGS. 3A to 3D are diagrams illustrating various toner saving methods according to various examples.

Figure 3A:
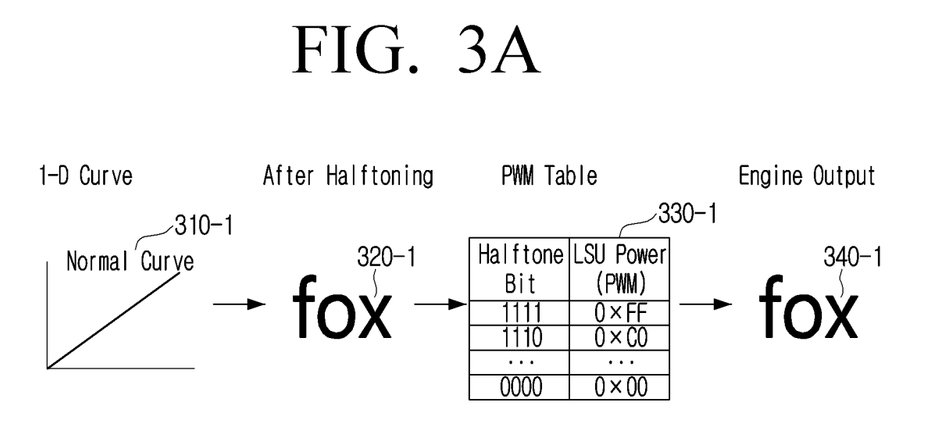
FIGS. 3A to 3D are diagrams illustrating various toner saving methods according to various examples.

An example processing operation of normal print data will be described with reference to FIG. 3A. Referring to FIG. 3A, if print data is received, rendering may be performed on the received print data and bitmap data may be generated.

Based on the generated bitmap data, halftoning using a one-dimensional (1-d) curve 310-1 with a constant gradient may be performed to generate binary data and a binary image 320-1. Halftoning refers to a process of displaying an image in gray-scale with certain concentrations of fine points, and may use a halftone table with a determined turn-on sequence based on the concentration.

For example, if bitmap data having a 50% gray-scale with respect to an area is input, binary data having 50% fine points (or dots) with respect to the corresponding area may be generated.

The power of an LSU corresponding to a color may be determined by using the generated binary data and a PWM table 330-1, and an exposure operation may be performed with the determined power. The PWM table 330-1 has a respective plurality of LSU power values for the plurality of halftone bit values.

An image 340-1 formed through the above-described operation may have a normal color concentration.

Example methods of adjusting a concentration of a color may vary. Various examples include adjusting a concentration of a color for overall print data and adjusting a concentration of a color for an object.

For example, if toner saving is performed for a black toner, a toner reduction process may be performed with respect to the whole area (i.e., whole object). In that case, the color concentration may be adjusted for a text object which primarily uses the black toner, and concentration reduction may not be performed for a graphic or an image object except for the text object.

In another example, if toner saving is necessary for a yellow toner, a magenta toner, or a cyan toner (i.e., except for the black toner), the toner saving process with respect to the color may be performed on the whole area (i.e., whole object) of the print data. In that case, concentration reduction on the graphic or the image object excluding the text object may be performed or a process of reducing the concentration on a color within the graphic or image object may be performed.

Accordingly, if a concentration reduction process is performed for an object corresponding to the color, toner consumption of the color may be reduced while minimizing the difference in image quality.

The concentration adjustment of a color may be made at various stages of the image processing process with respect to the print data. For example, concentration reduction is possible during the exposure process, during the conversion process to binary data, during the halftoning process, and during the rendering operation. An example operation of concentration reduction will be described below with reference to FIG. 3B.

Figure 3B:
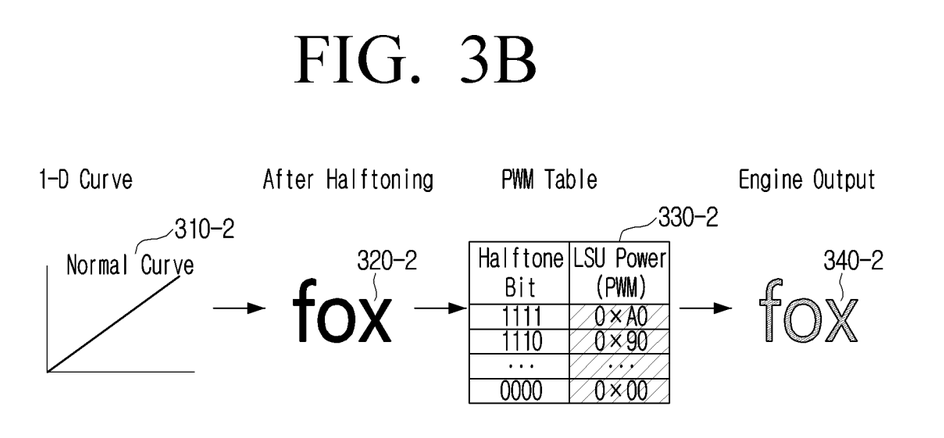

In an example, the exposure apparatus may perform an exposure operation using an exposure intensity which corresponds to the halftone bit value by using the PWM table, and the concentration may increase as the exposure intensity increases and the toner attachment range widens.

Reflecting the above, if the concentration reduction is required with respect to a color, a second PWM table 330-2, which has lower LSU power values than the previous PWM table 330-1, may be used. In that case, halftoning using a 1-d curve 310-2, similar to the 1-d curve 310-1 with a constant gradient may be used to generate binary data and a binary image 320-2, similar to the binary image 320-1. Since exposure is performed at a lower intensity than previously by using the second PWM table 330-2, the concentration may be reduced with respect to the corresponding color. An image 340-2 formed through the above-described operation may have a reduced color concentration.

If the color requiring toner saving is black and toner saving is performed with respect to text only, the print engine 120 may use both the PWM tables (e.g., 330-1 and 330-2) to perform the print job. For example, the print engine 120 may use the second PWM table 330-2 with the smaller LSU power value at the time of exposure with respect to the text, and use the first PWM table 330-1 having the normal LSU power value with respect to the area excluding the text. The PWM described above may be identical for each color, or may be different from one another.

In addition, although a normal case and a case using another PWM table when toner saving is necessary have been illustrated and described above, another PWM table may also be used according to the difference in residual quantity ratio by using a plurality of PWM tables having different LSU power values with respect to the same halftone value at the time of implementation.

Figure 3C:
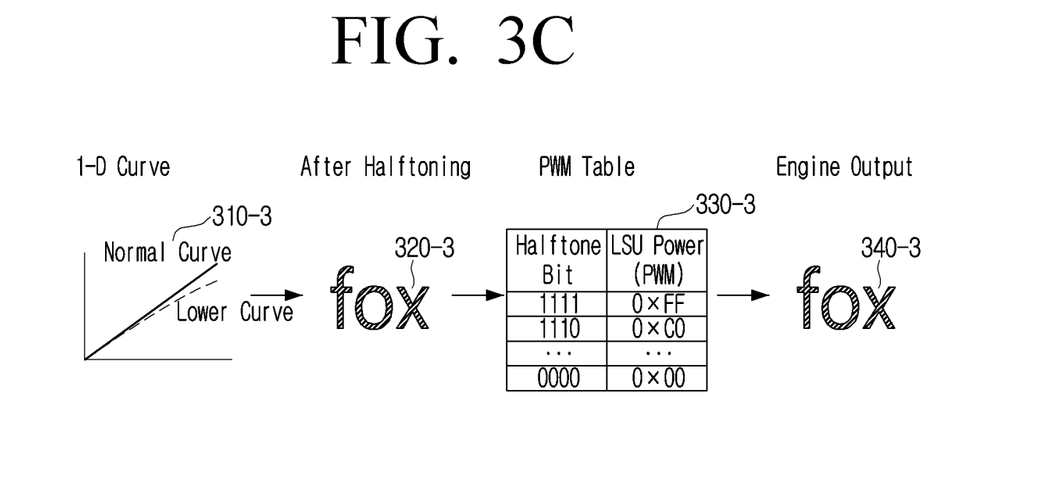

An example concentration reduction operation in the conversion process to binary will be described below.

Referring to FIG. 3C, in a normal case, when converting bitmap data to binary data, the 1-d curve 310-1 having the same gradient may be used. The 1-d curve 310-1 represents the number or concentration of dots to be displayed for a value of the binary data with respect to the gray-scale value. The normal 1-d curve 310-1 increases in the number of dots in proportion to the gray-scale value at a constant rate.

If concentration reduction is necessary, a 1-d curve different from the normal 1-d curve 310-1 may be used to generate the binary data. As illustrated, the different 1-d curve 310-3 (i.e., the lower curve) may express a lower concentration (e.g., fewer points or dots) as compared to the concentration according to the normal curve 310-1. That is, the lower curve 310-3 may increase the number of dots in proportion to the gray-scale value at a non-constant rate.

Accordingly, generated binary data and a binary image 320-3 having a smaller dot (or point) concentration than that based on the normal 1-d curve 310-1 may be obtained. Using the generated binary data, the power of an LSU may be determined using a PWM table 330-3, which is similar to the PWM table 330-1, and an exposure operation may be performed with the determined power. The image 340-3 may be formed as a result thereof.

Figure 3D:
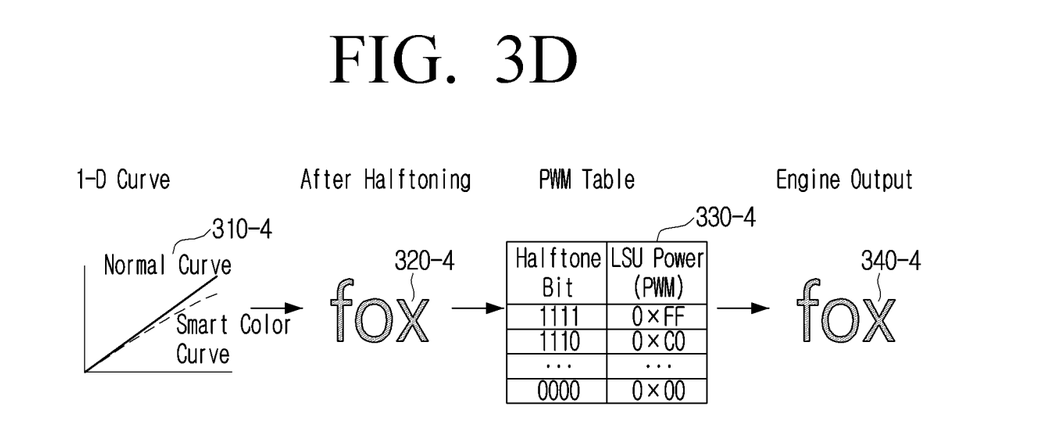

An example operation of concentration reduction using a new halftone pattern will be described below.

Referring to FIG. 3D, halftoning may use a halftone pattern at the time of converting bitmap data to binary data. The halftone pattern may have a turn-on sequence corresponding to a concentration. Since the concentration is reduced when the number of turn-on sequences with respect to the same concentration is small, binary data may be generated corresponding to the toner with the low toner residual quantity ratio by using a second halftone table having a different turn-on sequence than the halftone table used for the normal print data.

Accordingly, the second halftone table may have a different structure from a normal halftone table, and may determine a 1-d curve 310-4 at a level that reduces or minimizes the degradation of image quality while reducing toner consumption. Since the halftone pattern is based on the second halftone table having a different turn-on sequence, the form of the binary images 320-3 and 320-4 being different may be confirmed by comparing the binary data of FIGS. 3C and 3D. Generated binary data may be used to determine the power of an LSU using a PWM table 330-4, which is similar to the PWM table 330-1, and an exposure operation may be performed with the determined power. The image 340-4 may be formed as a result thereof.

An example operation of concentration reduction in a rendering process is described below with reference to FIG. 4.

Figure 4:
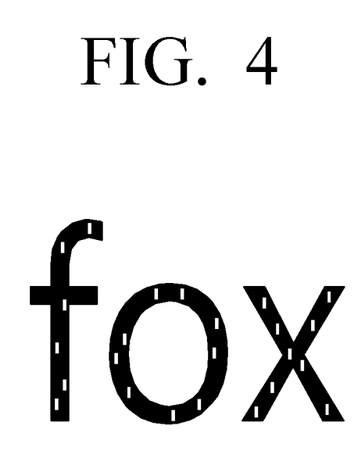
FIG. 4 is a diagram illustrating a toner saving method on a text according to an example.

FIG. 4 is a diagram illustrating a toner saving method on a text according to an example.

Referring to FIG. 4, a white spot may be inserted on a text object. In an enlarged image, as illustrated in FIG. 4, the white spot is noticeable to the eye. However, the text including the white spot is not distinguishable from a normal text if the white spot is small in size.

In an example, an amount of toner saved corresponds to an area of the white spot. For example, if toner saving on the text is performed, white spots may be inserted within the text at the time of performing rendering on the text object.

When illustrating and describing FIGS. 3A to 3D and 4, although it has been illustrated and described that any one method of the above-described various example toner saving techniques may be applied when toner saving is performed, combining the above-described methods may also be possible at the time of implementation.

For example, if toner saving is necessary, white spots may be inserted with respect to a text object while a PWM table with a low LSU power may be used with respect to a graphic object and an image object except for the text object.

As described above, the toner saving technique according to an example minimizes degradation in image quality while reducing toner consumption of a toner.

At the time of implementation, only one of the above described example methods may be applied to the image forming apparatus, or all of the various example methods may be applied to the image forming apparatus. If all of the various example methods are applied to the image forming apparatus, the processor 130 may determine an optimum toner saving method by analyzing the input print data, and may use the determined toner saving method.

In the above, although an example has been illustrated and described in which a toner saving operation based on 4-toner colors C, M, Y, and K is performed, the above-described example toner saving operation may also be performed on the C, M, and Y toners while excluding the K toner at the time of implementation.

In addition, although an example image forming apparatus has been described as using 4-toners, the image forming apparatus may further include toners different from the above-described colors at the time of implementation, also perform the toner saving operation by including the toner color added according to the implementation method, and also apply the toner saving operation to the remaining colors (i.e., CMYK) except for the added toner color or applied to the CMY color.

Figure 5:
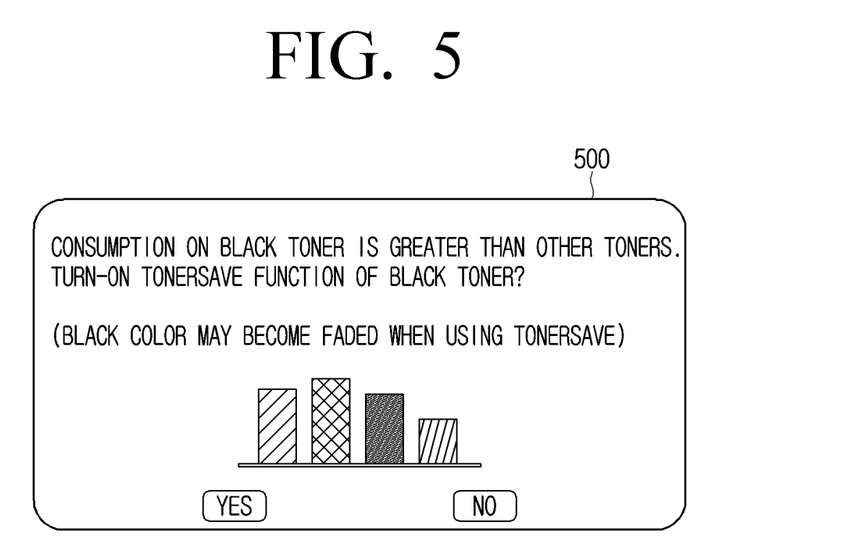
FIG. 5 is a diagram illustrating a user interface window according to an example.

FIG. 5 is a diagram illustrating a user interface window according to an example.

Referring to FIG. 5, a user interface window 500 may, if the difference of the residual quantity ratio of toners for each color is greater than or equal to a determined value, include information displaying that reduction of use of a toner having a lower ratio may be performed.

If the user authorizes the toner saving operation in the displayed user interface window 500, the toner saving operation with respect to a color may be automatically performed while there is a color difference.

If the difference in residual quantity ratio with respect to a color has become less than or equal to a determined value based on the application of the toner saving operation, the above-described set operation may be cancelled. For example, if the residual quantity difference is 7% or more, a toner saving operation may be performed, and if the difference is less than 5%, the toner saving operation may be automatically cancelled.

Figure 6:
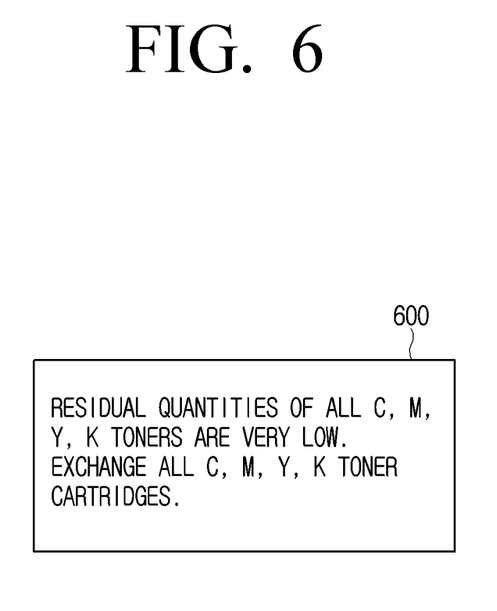
FIG. 6 is a diagram illustrating a user interface window according to an example.

FIG. 6 is a diagram illustrating a user interface window according to an example. In the example of FIG. 6, a reference value in a cancellation process may be smaller than a reference value of the previous start stage.

Referring to FIG. 6, a user interface window 600 may display that replacement of the toner cartridges within the print engine is necessary if the residual quantity ratios for each color are all less than or equal to a determined minimum ratio. As described above, since replacement is guided in case the toner residual quantities of all toner cartridges fall to a minimum ratio, the user may easily replace the toners at one time.

Figure 7:
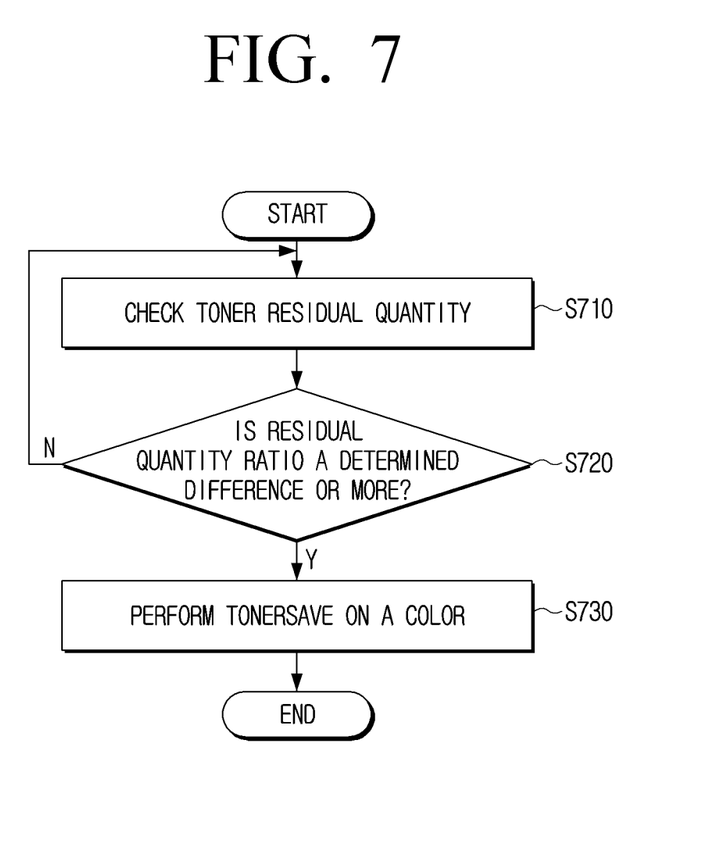
FIG. 7 is a flowchart illustrating an image forming method according to an example.

FIG. 7 is a flowchart illustrating an image forming method according to an example.

Referring to FIG. 7, toner quantity information of different colors may be stored in operation S710. For example, the toner quantity information may be stored for each color in a general memory, may be stored separately by colors in a memory mounted on the toner cartridge corresponding to the color, and the like.

A difference in residual quantity ratios of toners for each color may be determined based on the stored toner quantity information in operation S720. For example, a difference between the largest value and the lowest value of the toner residual quantity being greater than or equal to a determined ratio such as, for example, 5% to 7%, may be confirmed based on the stored toner quantity information. In that case, toner saving may be applied with respect to a color.

If the difference in the residual quantity ratio of the toners for each color is greater than or equal to a determined value, a print job may be performed by reducing the use of the toner with the smallest residual quantity ratio of toners in operation S730. For example, a print job may be performed by using a PWM table with a low LSU power value with respect to the color corresponding to the toner with the small residual quantity ratio, by using the halftone table with a small turn-on sequence in the halftoning process, or by generating binary data using a 1-d curve lower than a previous 1-d curve.

Figure 8:
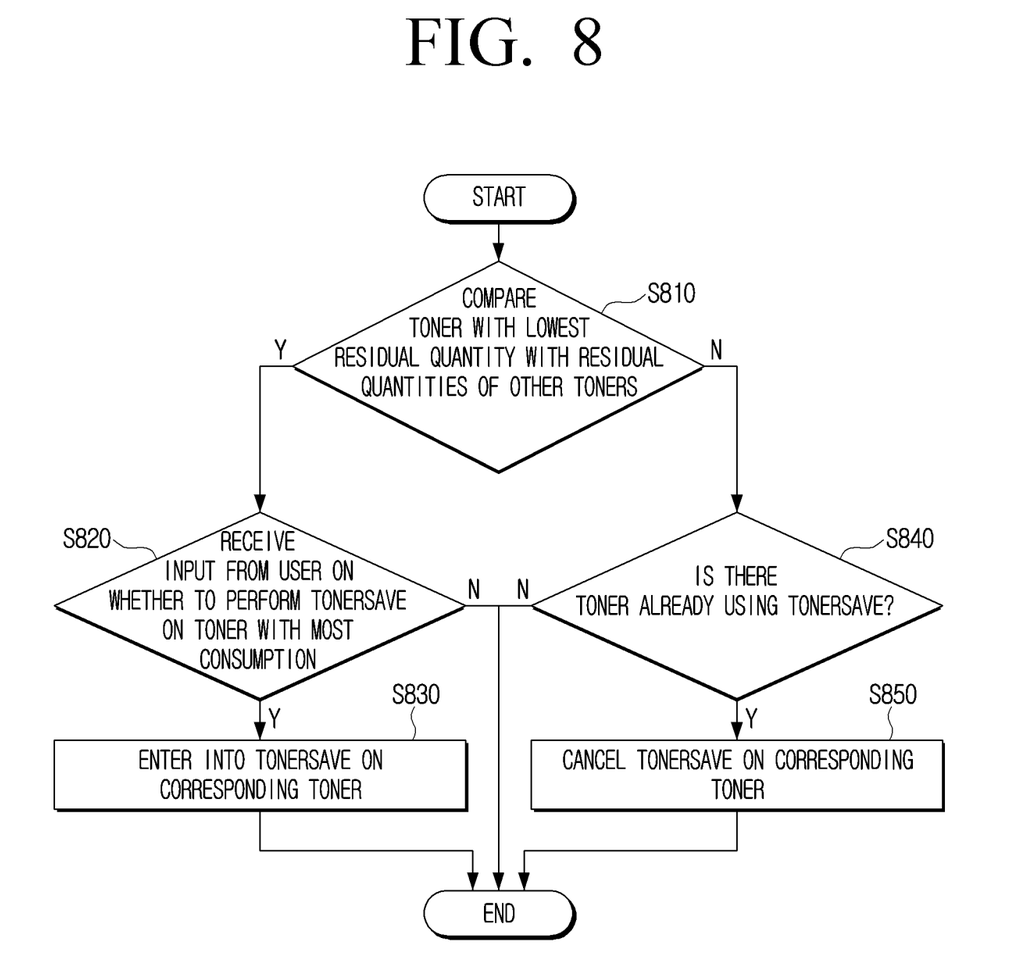
FIG. 8 is a flowchart illustrating a toner saving method according to an example.

FIG. 8 is a flowchart illustrating a toner saving method according to an example.

Referring to FIG. 8, residual quantities of a toner with the lowest residual quantity and the remaining toners may be compared in operation S810 and it may be determined whether a difference in residual quantity is greater than or equal to a determined value in operation S810. As an example, if the respective residual quantities of the toners for the C/M/Y/K colors is 90%, 84%, 85% and 87%, the residual quantity of the lowest amount of toner (M) may be compared with the residual quantities of the remaining toners (C, Y, K).

Through the operation of comparing residual quantities as above, if the difference is greater than or equal to a determined residual quantity, a question on whether to perform the toner saving operation with respect to a color may be made to the user.

If, in response to the display operation described above, selection of a toner saving mode on the toner with the most consumption is received from the user in operation S820, a toner saving mode with respect to a color may be set which is capable of performing toner saving on a corresponding color when performing a print job thereafter in operation S830.

For example, if the difference in determined ratio is 5%, and if the difference in residual quantity of M toner and C toner is 6% in the above-described example, the image forming apparatus may inquire whether to proceed with toner saving on the M toner to the user. If the user instructs to save toner, the image forming apparatus may perform a toner saving operation on the M toner at the time of the print job.

If the difference in residual quantity between the M toner and the remaining toners is less than 5% based on the above-described toner saving operation, a determination of whether a toner already using a toner saving process may be made in operation S840.

Based on the determination result, if the toner saving mode with respect to a color was already set, the setting of the toner saving mode with respect to the corresponding toner may be cancelled in operation S850. By cancelling the setting, a normal print job without the application of the saving mode with respect to a color may be performed when a print job is requested thereafter.

Figure 9:
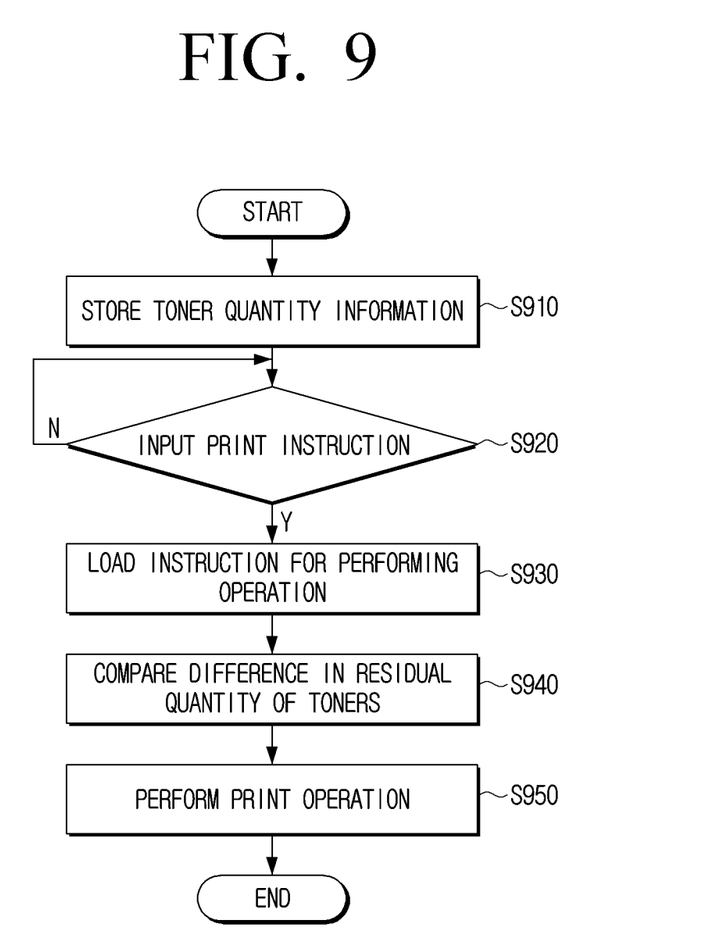
FIG. 9 is a flowchart illustrating a print control method based on a difference in residual quantity ratio of toners according to an example.

FIG. 9 is a flowchart illustrating a print control method based on a difference in residual quantity ratio of toners according to an example. For example, the print control method of FIG. 9 may be comprised of a plurality of instructions and stored in the memory.

Referring to FIG. 9, the toner quantity information of different colors may be stored in operation S910. For example, when a print job is completed, the used toner quantity may be determined and the quantity information on the previous residual toner quantity information may be updated. Alternatively, if the toner quantity of the toner cartridge may be detected, the toner quantity of the toner cartridge may be detected at a determined time, and the detected toner quantity may be stored. In FIG. 9, the operation of storing the toner quantity information has been illustrated as being performed before other operations, but may be performed as the last operation, that is performed after the print job at the time of implementation.

If a print instruction is input under circumstances such as the above in operation S920, the instruction for the print job (or a determining operation of a toner saving mode with respect to a color) may be loaded in the memory in operation S930, and the following operation may be performed based on the loaded instruction.

If the instruction is loaded, a difference in residual quantity ratio of toners for each color may be determined based on the stored toner quantity information in operation S940. For example, the difference of the largest value and the lowest value in the toner residual quantity being greater than or equal to a determined ratio such as, for example, 5% to 7%, may be confirmed based on the stored toner quantity information, and it may be determined to perform toner saving with respect to a color.

The print job may be performed based on the comparison result in operation S950. For example, if the ratio difference of toner residual quantity is less than a determined value, that is if the difference in residual quantity is small, the print job may be performed without applying a separate toner saving operation. Alternatively, if the ratio difference of the toner residual quantity is greater than or equal to a determine value, that is if there is a difference in residual quantity, the print job may be performed by reducing toner use on the toner with the small residual quantity. The various examples of a toner saving method have been described above and overlapping descriptions thereof will be omitted.

The various example methods related to the above-described method may, by having the toner quantities of the plurality of toner cartridges be used similarly, make it possible to have the replacement time points of the plurality of cartridges close to each other or match each other.

The above-described example image forming method may be implemented as a program and provided to an image forming apparatus. The program including the image forming method may be stored and provided on a non-transitory computer readable medium.

The non-transitory computer readable medium may refer to a machine readable medium that stores data semi-permanently and not a medium that stores data for a short period such as a register, a cache, and a memory. For example, the programs for performing the various above-described methods may be stored and provided on a non-transitory computer readable medium such as a compact disc (CD), a digital versatile disc (DVD), a hard disc, a Blu-ray disc, a USB, memory card, and a read only memory (ROM).

In the above, the examples of the disclosure have been illustrated and described, but the disclosure is not limited to the above-described specific examples, and various changes in form and details may be made by those of ordinary skill in the related art without departing from the spirit and scope as defined, by the following claims and their equivalents.

What is claimed is:

1. An image forming apparatus, comprising:
   a print engine to form an image by using toners of different colors;
   a memory to store toner quantity information of the different colors of toners; and
   a processor to:
      determine a residual quantity ratio of the toners for each of the different colors of toner, based on the stored toner quantity information;
      determine, based on the residual quantity ratio of the toners for each of the difference colors of toner, a largest value in the residual quantity ratio and a lowest value in the residual quantity ratio;
      perform a print job by reducing a use of a toner with a smallest toner residual quantity ratio and the lowest value in the residual quantity ratio when a difference in the residual quantity ratio of the toner for the largest value and the lowest value each color is greater than or equal to a determined value and
      cancel reduction of use of the toner when the difference in the residual quantity ratio of the toner for the largest value and the lowest value is less than the determined value.

2. The image forming apparatus of claim 1, wherein the processor is to perform the print job by adjusting an output concentration on a color corresponding to an object including the toner with the smallest toner residual quantity ratio or to the toner with the smallest toner residual quantity ratio.

3. The image forming apparatus of claim 1, wherein the print engine includes a plurality of laser scanning units (LSUs), and each of the plurality of LSUs is to form an image by using a first pulse width modulation (PWM) table having a plurality of halftone bit values and an LSU power value with respect to each of the plurality of halftone bit values, and
   wherein the processor is to control the print engine to form an image by using a second PWM table having a smaller value than the LSU power value of the first PWM table with respect to the halftone bit value with a same LSU, which corresponds to the toner with the smallest toner residual quantity ratio of the plurality of LSUs.

4. The image forming apparatus of claim 1, wherein the processor is to generate a plurality of binary data based on input print data, and generate binary data by using a second one-dimensional (1-d) curve different from a first 1-d curve which is used when generating binary data on remaining colors with respect to a color corresponding to the toner with the smallest toner residual quantity ratio.

5. The image forming apparatus of claim 1, wherein the processor is to:
   generate a plurality of binary data by using a halftone table, and
   generate a binary data by using a second halftone table with a different turn-on sequence than the halftone table with respect to a color corresponding the toner with the smallest toner residual quantity ratio.

6. The image forming apparatus of claim 1, wherein the processor is to perform the print job by adjusting a concentration of a text in a print data when the toner with the smallest toner residual quantity ratio is a black toner.

7. The image forming apparatus of claim 6, wherein the processor is to perform the print job by inserting a white spot in the text when the toner with the smallest toner residual quantity ratio is the black toner.

8. The image forming apparatus of claim 1, wherein the processor is to perform the print job by adjusting a concentration of an image object in a print data if the toner with the smallest toner residual quantity ratio is not a black toner.

9. The image forming apparatus of claim 1, wherein the processor is to perform the print job by adjusting a concentration of a color corresponding to the toner with the smallest toner residual quantity in an image object with respect to the image object in a print data if the toner with the smallest toner residual quantity ratio is not a black toner.

10. The image forming apparatus of claim 1, further comprising:
    a display,
    wherein the processor is to control the display to display that reduction of use of the toner with the smallest toner residual quantity may be performed when a difference in the residual quantity ratio of toners for each color is greater than or equal to the determined value on a basis of the stored toner quantity information.

11. The image forming apparatus of claim 1, further comprising:
    a display,
    wherein the processor is to control to the display to display that a replacement of a toner cartridge is necessary in the print engine when the respective residual quantity ratios of toners for each color are all less than or equal to a determined minimum ratio.

12. An image forming method, comprising:
    storing toner quantity information of different colors of toners;
    comparing a difference in a residual quantity ratio of toners for each color on a basis of the stored toner quantity information;
    determining, based on the comparison, a largest value in the residual quantity ratio and a lowest value in the residual quantity ratio;
    performing a print job by reducing a use of a toner with a smallest toner residual quantity ratio and the lowest value in the residual quantity ratio when the difference in the residual quantity ratio of the largest value and the lowest value is greater than or equal to a determined value; and
    canceling reduction of the use of the toner with the smallest toner residual quantity ratio when the difference in the residual quantity ratio of the largest value and the lowest value is less than the determined value.

13. The image forming method of claim 12, wherein the performing of the print job comprises:
    performing the print job by adjusting an output concentration on an object including the toner with the smallest toner residual quantity ratio or a color corresponding to the toner with the smallest toner residual quantity ratio.

14. The image forming method of claim 12, wherein the performing of the print job comprises;
    performing the print job by adjusting a concentration of a text in print data if the toner with the smallest toner residual quantity ratio is a black toner; and
    performing the print job by adjusting a concentration of an image object in the print data if the toner with the smallest toner residual quantity ratio is not the black toner.

15. A non-transitory computer readable recording medium comprising a program to execute an image forming method, the non-transitory computer readable recording medium comprising:
- instructions to store toner quantity information of different colors of toners;
- instructions to compare a difference in residual quantity ratio of toners for each color on a basis of the stored toner quantity information;
- instructions to determine, based on the comparison, a largest value in the residual quantity ratio and a lowest value in the residual quantity ratio;
- instructions to perform a print job by reducing a use of a toner with a smallest toner residual quantity ratio and the lowest value in the residual quantity ratio when a difference in the residual quantity ratio of the largest value and the lowest value is greater than or equal to a determined value; and
- instructions to cancel reduction of the use of the toner with the smallest toner residual quantity ratio when the difference in the residual quantity ratio of the largest and the lowest value is less than the determined value.

* * * * *